United States Patent [19]
Simmons

[11] Patent Number: 5,884,408
[45] Date of Patent: Mar. 23, 1999

[54] GRADUATED MEASURING DEVICE WITH COLOR CODED INDICIA

[76] Inventor: Glenn Simmons, 101 Barrett Dr., Beaver, Pa. 15009

[21] Appl. No.: 424,064

[22] Filed: Apr. 19, 1995

[51] Int. Cl.⁶ .............................. B43L 7/00; G01B 3/02; G01B 3/10
[52] U.S. Cl. ............................................. 33/494; 33/761
[58] Field of Search ........................ 33/494, 755, 759, 33/760, 761, 679.1, 495, 456, 478, 458

[56] References Cited

U.S. PATENT DOCUMENTS

| | | | |
|---|---|---|---|
| 1,372,691 | 3/1921 | Herman et al. | 33/494 |
| 1,469,944 | 10/1923 | Merrill. | |
| 1,602,490 | 10/1926 | Homan. | |
| 1,776,245 | 9/1930 | Barrett. | |
| 1,816,548 | 7/1931 | Robidoux. | |
| 2,077,828 | 4/1937 | Dombrowski. | |
| 2,561,020 | 7/1951 | Gerber | 33/41 |
| 4,323,234 | 4/1982 | Glaese | 272/93 |
| 4,547,969 | 10/1985 | Haack. | |
| 4,750,270 | 6/1988 | Kundikoff | 33/494 |
| 4,970,797 | 11/1990 | Sarasin | 33/494 |
| 5,335,421 | 8/1994 | Jones, Jr. | 33/494 |

FOREIGN PATENT DOCUMENTS

| | | | |
|---|---|---|---|
| 2186692 | 8/1987 | United Kingdom | 33/755 |
| 93/00565 | 1/1993 | WIPO | 33/494 |

*Primary Examiner*—G. Bradley Bennett
*Attorney, Agent, or Firm*—Webb Ziesenheim Bruening Logsdon Orkin & Hanson, P.C.

[57] ABSTRACT

A measuring device having an elongated member with at least one measuring edge and a measuring indicia including successive groups of equally spaced color coded measuring marks located adjacent to and extending along the length of the measuring edge. Each successive group is identified by a different label. Each individual measuring mark corresponds to a selected fractional portion of the group wherein it is located and has a color which is different from all of the remaining measuring marks in the group and is the same color as the measuring marks in each successive group which correspond to the corresponding fractional portion in each successive group.

16 Claims, 2 Drawing Sheets

GRADUATED MEASURING DEVICE WITH COLOR CODED INDICIA

BACKGROUND OF THE INVENTION

1. Field of the Invention

This invention relates generally to measuring devices, and more particularly, to measuring devices having color coded indicia thereon to facilitate the measurement of fractional lengths with a minimum of errors and loss of time.

2. Description of the Prior Art

It has been observed that the measurement of fractional lengths is particularly difficult to a significant number of people. Furthermore, it is difficult to differentiate between and to locate gradations along a tape or a ruler without tediously counting the individual gradations. Many devices have been proposed to help with the measurement of different lengths. An example of such a device is disclosed in U.S. Pat. No. 1,816,548, which assists with fractional measurement. Other devices which have been proposed to solve the aforementioned problem through the use of color combinations are disclosed in U.S. Pat. Nos. 2,561,020, 4,323,234 and 5,335,421. However, none of these devices permits the easy, accurate and convenient measure of fractional lengths without counting the individual gradations.

It is the object of the invention to provide a measuring device which assists in the measurement of fractional lengths. It is a further object of the invention to provide a device which is easy to use, inexpensive and simple in construction.

SUMMARY OF THE INVENTION

A device for measuring lengths which includes an elongated member having measuring indicia thereon. The measuring indicia includes groups of equally spaced color coded measuring marks spaced along a measuring edge and a label identifying each successive group. Each measuring mark in each individual group is a different color. However, measuring marks corresponding to specific fractional lengths in each successive group are the identical color thereby enabling a person to associate a particular fraction with a specific color throughout the length of the measuring device to facilitate measuring fractions.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
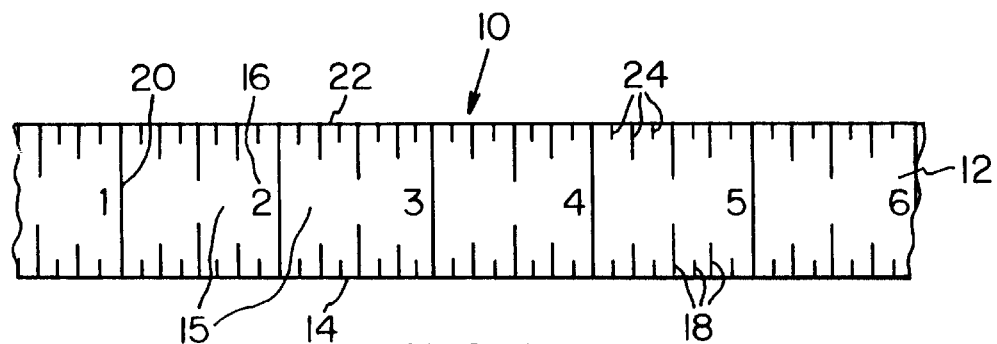
FIG. 1 is a plan view of a portion of a ruler with color coded indicia in accordance with the invention.

The advantages of a measuring device according to the present invention are apparent with reference to FIG. 1 of the drawings. FIG. 1 shows a portion of a ruler 10 having measuring indicia along opposed substantially parallel measuring edges 14 and 22. The measuring indicia preferably includes two sets of measuring marks 18 and 24, group dividers 20 and group labels 16. As shown in FIG. 1, the group dividers 20 traverse to the width of the elongated member 12 between measuring edges 14 and 22 and perpendicular to the edges. Group labels 16 are located between adjacent group dividers 20 and include integers which increase by one number for each respective group 15.

In the English system of measurement, measuring device 10 will have measuring indicia calibrated in inches and fractions thereof. Each group divider 20 corresponds to an inch as shown in FIG. 1. The measuring marks 18 and 24 consist of a series of gradations in fractions of an inch. The gradations are ⅛", ¼", ⅜", ½", ⅝", ¾" and ⅞". It will be understood by those skilled in the art that the invention may be calibrated for use with the metric system or any other system of linear measurement and the size of the individual gradations may include sixteenths or sixty-fourths.

A first set of adjacent measuring marks 18 is located along the first edge 14 of elongated member 12. Each individual measuring mark 18 along measuring edge 14 in each group 15 is a different color than all of the remaining measuring marks 18 in that group.

Figure 3:
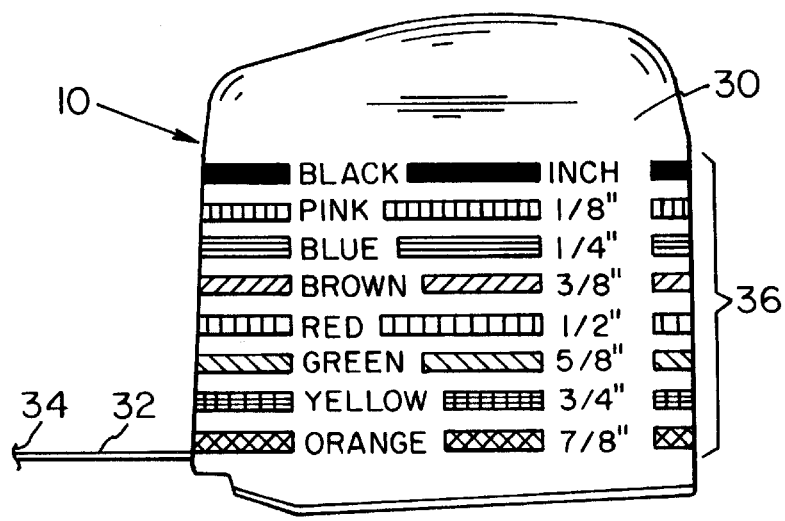
FIG. 3 is a side elevation of the tape and housing shown in FIG. 2.

As shown in FIG. 3 of the drawings, a repetitive color code 36 is generated for each group 15. This particular code is for ⅛" gradations wherein pink represents ⅛", blue represents ¼", brown represents ⅜", red represents ½", green represents ⅝", yellow represents ¾" and orange represents ⅞". The group dividers 20 (inch marks) are black.

Figure 2:
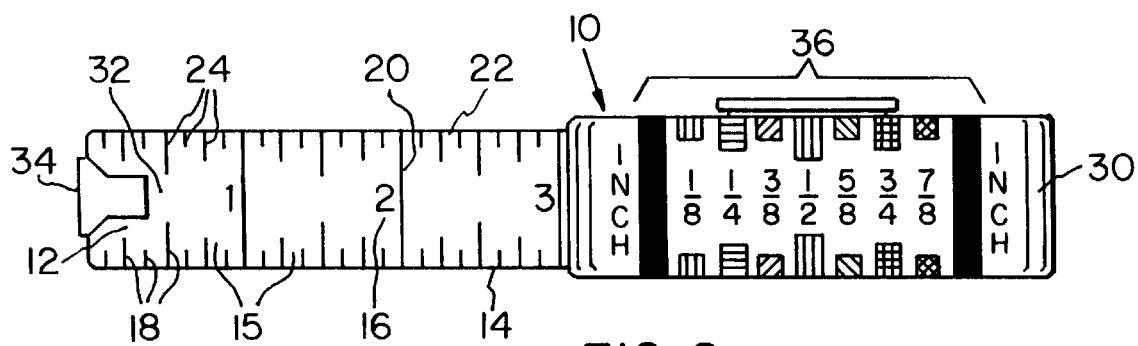
FIG. 2 is a plan view of a tape measure and a housing therefor having a chart showing the indicia color code according to the invention.

When the color code chart 36 is used, the user will not have to count the gradations to make fractional measurements. Further, the color code chart 36 is conveniently placed on measuring device 10, as shown in FIGS. 2 and 3. This color code chart serves as a reference guide if the color code is forgotten by the user.

When a specific measurement is required, the user merely uses the group labels 16 to obtain the measurement in inches and the color code to locate the fractional measurement. It will be apparent that measuring device 10 allows the user to quickly, easily and accurately obtain fractional measurements without counting the individual measuring marks 18 or fractions.

A preferred embodiment of the invention includes a second set of measuring marks 24 along second edge 22 of measuring device 10. As shown in FIG. 1, this second set of measuring marks 24 is identical and corresponds to the first set of measuring marks 18 except that all gradations in the second set of measuring marks 24 are the same color, preferably black. This second set of single color measuring marks 24 is provided for users who wish to utilize the measuring device 10 in the traditional manner.

The color coded set of measuring marks may be used on various measurement devices for quick and accurate measurements. For example, FIGS. 2 and 3 show a flexible tape 32 with color coded indicia 18 and a color code chart on tape housing 30. Tape 32 has first and second measuring edges 14 and 22 as shown in FIG. 2. The first set of measuring marks 18 is located adjacent to measuring edge 14 and the second set of measuring marks 24 is located adjacent to second measuring edge 22.

Figure 4:
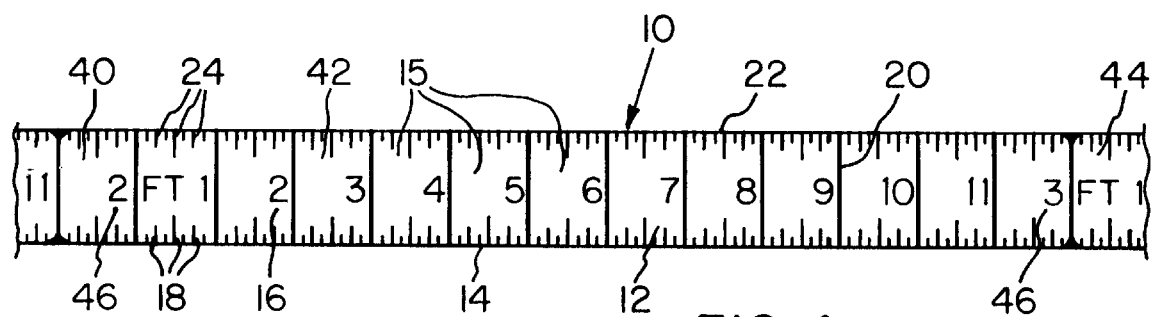
FIG. 4 is a plan view of a carpenter's rule with color coded indicia according to the invention.

The color coded measuring marks may alternatively be used on a carpenter's rule having pivotally connected sections 40, 42 and 44 as shown in FIG. 4 of the drawings. A first set of multiple color measuring marks 18 are located adjacent to first measuring edge 14 on the carpenter's rule. The preferred embodiment includes a second set of single color measuring marks 24 along measuring edge 22.

Figure 5:
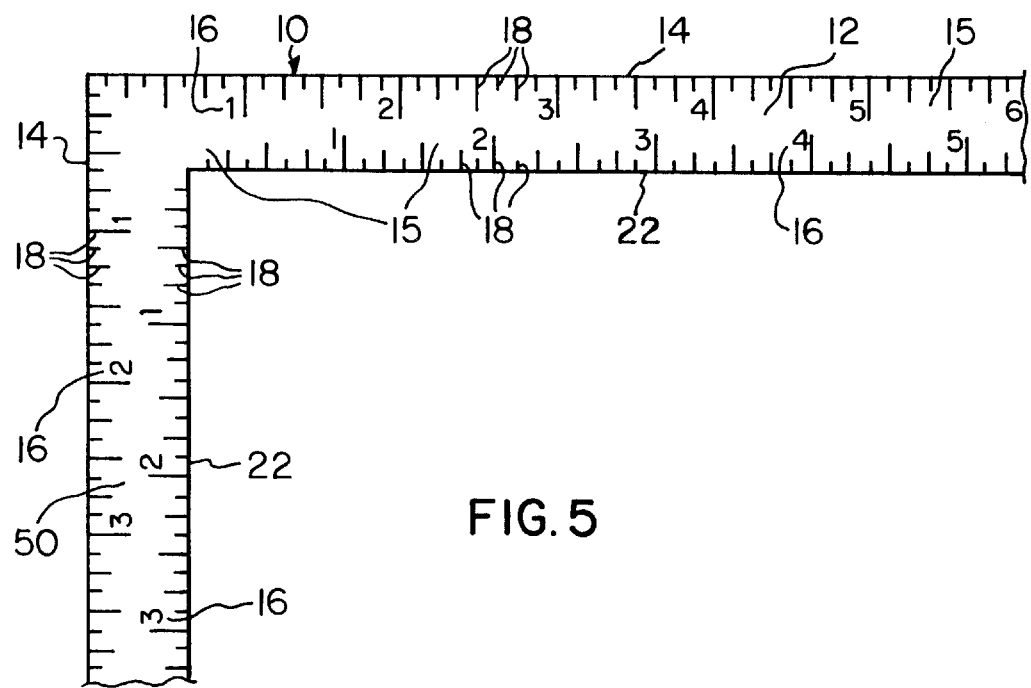
FIG. 5 is a plan view of a carpenter's square with color coded indicia according to the invention.

As shown in FIG. 5, the color coded measuring marks may be used on a carpenter's square wherein one end of a straight member 50 is attached, at a right angle, to one end of elongated member 12. All measuring marks 18 adjacent to the first measuring edges 14 and the second measuring edges 22 of the carpenter's square will be color coded in accordance with the invention. Providing color coded measuring marks on measuring edges 14 and 22 of the carpenter's square will enable the user to easily measure fractional lengths on both measuring edges 14 and 22. In this embodiment, the group dividers 20 do not traverse elongated member 12 or straight member 50, but extend from both measuring edges 14 and 22 toward the middle of elongated member 12 and straight member 50.

In addition to the embodiments shown in the application drawings, the color coded measuring indicia may be used on other measuring devices, such as a protractor and a machinist rule, to facilitate the measurement of fractions.

While preferred embodiments of this invention have been described in detail herein, it will be appreciated by those skilled in the art that various modifications and alternatives to the preferred embodiments may be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A measuring device comprising:
   an elongated member having a measuring edge with a finite length; and
   measuring indicia including successive groups of equally spaced color coded measuring marks located adjacent to and extending along the length of said measuring edge and a different group label identifying each of said successive groups;
   wherein each individual measuring mark corresponds to a selected fractional portion of each of said successive groups and has a different color than all of the remaining measuring marks in said group and is the same color as said measuring marks in each of said successive groups which correspond to the corresponding fractional portion in each of said successive groups, and including a code chart correlating each color of said measuring mark to a fractional portion of each of said successive groups.

2. A measuring device as set forth in claim 1, wherein said elongated member is a flexible tape.

3. A measuring device as set forth in claim 2 including a housing for storing an unused portion of said flexible tape.

4. A measuring device as set forth in claim 3 wherein said code chart is on said housing.

5. A measuring device as set forth in claim 1, wherein said elongated member includes a plurality of pivotally connected extendable segments.

6. A measuring device as set forth in claim 1 including a second member having an end attached at a right angle to one end of said elongated member and a measuring edge formed on said second member, said measuring edge having measuring marks located thereon.

7. A measuring device as set forth in claim 1, wherein said elongated member is rigid.

8. A measuring device comprising:
   an elongated member having a first measuring edge and a second measuring edge;
   a first set of measuring indicia located adjacent to said first edge and including successive groups of equally spaced color coded individual measuring marks located adjacent to said first measuring edge and a different group label identifying each of said successive groups, wherein each of said individual measuring marks in one of said groups corresponds to a selected fractional portion of said group and has a different color than all of the remaining measuring marks in said successive group and is the same color as said measuring marks in each of said successive groups which correspond to the corresponding fractional portion in each of said successive groups; and
   a second set of measuring indicia located adjacent to said second measuring edge and including measuring marks complementary with said measuring marks in said first set of measuring indicia, and including a code chart correlating each of said measuring marks of said first set of measuring indicia to a fractional portion of each of said successive groups.

9. A measuring device as set forth in claim 8, wherein all of said measuring marks in said second set of measuring indicia are the same color.

10. A measuring device as set forth in claim 8, wherein said elongated member is a flexible tape.

11. A measuring device as set forth in claim 10 including a housing for storing an unused portion of said flexible tape.

12. A measuring device as set forth in claim 11 wherein said code chart is on said housing correlating each color of said measuring marks of said first set of measuring indicia to a fractional portion of each of said successive groups.

13. A measuring device as set forth in claim 8, wherein said elongated member includes a plurality of pivotally connected individual segments.

14. A measuring device as set forth in claim 8 including a second member having an end attached at a right angle to one end of said elongated member and a first measuring edge and a second measuring edge formed on said second member, wherein said first set of measuring indicia is located along said first measuring edge and said second set of measuring indicia is located along said second measuring edge.

15. A measuring device as set forth in claim 14, wherein each individual measuring mark in said second set of measuring indicia is the same color as a corresponding measuring mark in said first set of measuring indicia.

16. A measuring device comprising:
   a flexible tape having a first measuring edge and a second measuring edge;
   a housing for storing an unused portion of said flexible tape;
   a first set of measuring indicia located adjacent to said first edge and including successive groups of equally spaced color coded individual measuring marks located adjacent to said first measuring edge and a different group label identifying each of said successive groups, wherein each of said individual measuring marks in one of said groups corresponds to a fractional portion of said group and has a different color than all of the remaining measuring marks in said group and is the same color as said measuring marks in each of said successive groups which correspond to the corresponding fractional portion in each of said successive groups;

a second set of measuring indicia located adjacent to said second measuring edge and including measuring marks which are complementary with said measuring marks in said first set of measuring indicia and are the same color; and a code chart on said housing correlating each color of said measuring marks in said first set of measuring indicia to the corresponding fractional portion of each of said successive groups.

* * * * *